United States Patent
Vigier et al.

(10) Patent No.: US 9,456,416 B2
(45) Date of Patent: Sep. 27, 2016

(54) SCORING BEACON MESSAGES FOR MOBILE DEVICE WAKE-UP

(71) Applicant: Apple Inc., Cupertino, CA (US)

(72) Inventors: Benjamin Vigier, San Francisco, CA (US); Corey G. Fugman, Saratoga, CA (US); Filip Krsmanovic, Sunnyvale, CA (US); Yingfeng Su, Sunnyvale, CA (US); Mathieu Roig, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/592,674

(22) Filed: Jan. 8, 2015

(65) Prior Publication Data

US 2016/0095063 A1    Mar. 31, 2016

Related U.S. Application Data

(60) Provisional application No. 62/057,581, filed on Sep. 30, 2014.

(51) Int. Cl.
| | |
|---|---|
| *H04W 48/00* | (2009.01) |
| *H04W 52/02* | (2009.01) |
| *H04W 4/00* | (2009.01) |

(52) U.S. Cl.
CPC ......... *H04W 52/0229* (2013.01); *H04W 4/008* (2013.01)

(58) Field of Classification Search
USPC ......... 455/456.1, 38.3, 31.3, 38.4, 434, 566, 455/574, 414, 412, 558, 564, 572; 370/332, 370/252, 343, 543, 336, 408, 469
See application file for complete search history.

(56) References Cited

U.S. PATENT DOCUMENTS

| | | | |
|---|---|---|---|
| 6,002,918 A | * | 12/1999 | Heiman ............ G06K 7/10356 340/7.23 |
| 6,816,730 B2 | | 11/2004 | Davies |

(Continued)

FOREIGN PATENT DOCUMENTS

| | | |
|---|---|---|
| EP | 2 733 502 | 5/2014 |
| WO | WO0157758 A1 | 9/2001 |
| WO | WO2014130958 A1 | 8/2014 |

OTHER PUBLICATIONS

International Search Report and Written Opinion in International Application No. PCT/US2015/048652, mailed Nov. 2, 2015, 15 pages.

(Continued)

*Primary Examiner* — Ganiyu A Hanidu
(74) *Attorney, Agent, or Firm* — Fish & Richardson P.C.

(57) ABSTRACT

Techniques and systems for scoring beacon messages and selectively performing mobile device wake-up on a score are disclosed. Such a technique can include receiving, at a mobile device in a first operational state, a beacon message from a beacon device over a short-range communication link; determining a score based on the beacon message and one or more criteria for causing a transition from the first operational state to a second operational state, the second operational state consumes more energy from a battery of the mobile device than the first operational state; determining whether the score exceeds a threshold for causing the transition; if the score does not exceed the threshold, maintaining the mobile device in the first operational state; and if the score exceeds the threshold, transitioning the mobile device to the second operational state and presenting the beacon message through the mobile device in the second operational state.

24 Claims, 10 Drawing Sheets

(56) References Cited

U.S. PATENT DOCUMENTS

| | | | |
|---|---|---|---|
| 7,010,267 B2 | 3/2006 | Vanluijt | |
| 7,397,424 B2 | 7/2008 | Houri | |
| 7,653,573 B2 | 1/2010 | Hayes | |
| 7,712,657 B1 | 5/2010 | Block | |
| 7,856,234 B2 | 12/2010 | Alizadeh-Shabdiz et al. | |
| 7,890,116 B2 | 2/2011 | Salokannel | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,160,045 B1 | 4/2012 | Chhabra | |
| 8,223,074 B2 | 7/2012 | Alizadeh-Shabdiz | |
| 8,254,414 B2 | 8/2012 | Sakoda | |
| 8,369,264 B2 | 2/2013 | Brachet et al. | |
| 8,478,297 B2 | 7/2013 | Morgan et al. | |
| 8,645,213 B2 | 2/2014 | Granbery | |
| 8,831,642 B2 | 9/2014 | Moldavsky | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 9,317,867 B2 | 4/2016 | Johnson | |
| 2008/0154735 A1 | 6/2008 | Carlson | |
| 2010/0150122 A1* | 6/2010 | Berger | H04W 4/02 370/338 |
| 2010/0287052 A1 | 11/2010 | Minter | |
| 2011/0319072 A1* | 12/2011 | Ekici | H04W 48/18 455/426.1 |
| 2011/0320293 A1 | 12/2011 | Khan | |
| 2012/0064855 A1 | 3/2012 | Mendelson | |
| 2013/0046602 A1 | 2/2013 | Grigg | |
| 2013/0094536 A1 | 4/2013 | Hui | |
| 2013/0099920 A1 | 4/2013 | Song | |
| 2013/0128786 A1* | 5/2013 | Sultan | H04W 52/0238 370/311 |
| 2013/0212017 A1 | 8/2013 | Bangia | |
| 2013/0297422 A1 | 11/2013 | Hunter | |
| 2013/0316725 A1* | 11/2013 | MacGougan | H04W 4/001 455/456.1 |
| 2014/0025232 A1 | 1/2014 | Cuddihy | |
| 2014/0058897 A1 | 2/2014 | Yang | |
| 2014/0064166 A1* | 3/2014 | HomChaudhuri | H04W 52/0216 370/311 |
| 2014/0081720 A1 | 3/2014 | Wu | |
| 2014/0089061 A1 | 3/2014 | Vitale | |
| 2014/0135042 A1 | 5/2014 | Buchheim | |
| 2014/0143139 A1 | 5/2014 | Koplovitz | |
| 2014/0154984 A1 | 6/2014 | Perrin et al. | |
| 2014/0207614 A1 | 7/2014 | Ramaswamy | |
| 2014/0207682 A1 | 7/2014 | Wolfond | |
| 2014/0236478 A1 | 8/2014 | Mermelstein | |
| 2014/0274150 A1 | 9/2014 | Marti et al. | |
| 2014/0358835 A1 | 12/2014 | Marti | |
| 2015/0063323 A1 | 3/2015 | Sadek | |
| 2015/0140982 A1 | 5/2015 | Postrel | |
| 2015/0235486 A1* | 8/2015 | Ellis | G07C 9/00309 340/5.61 |
| 2015/0294517 A1* | 10/2015 | Herrala | G07C 9/00309 340/5.61 |
| 2015/0339694 A1 | 11/2015 | Robbin et al. | |

OTHER PUBLICATIONS

Sean Hargrave, "Apple Pay and iBeacons—A Digital Marketing Revolution Could Be on Its Way", London Media Advertising Daily, http://www.mediapost.com/publications/article/233982/apple-pay-and-ibeacons-a-digital-marketing-revo.htlm, Sep. 11, 2014, 3 pages.

* cited by examiner

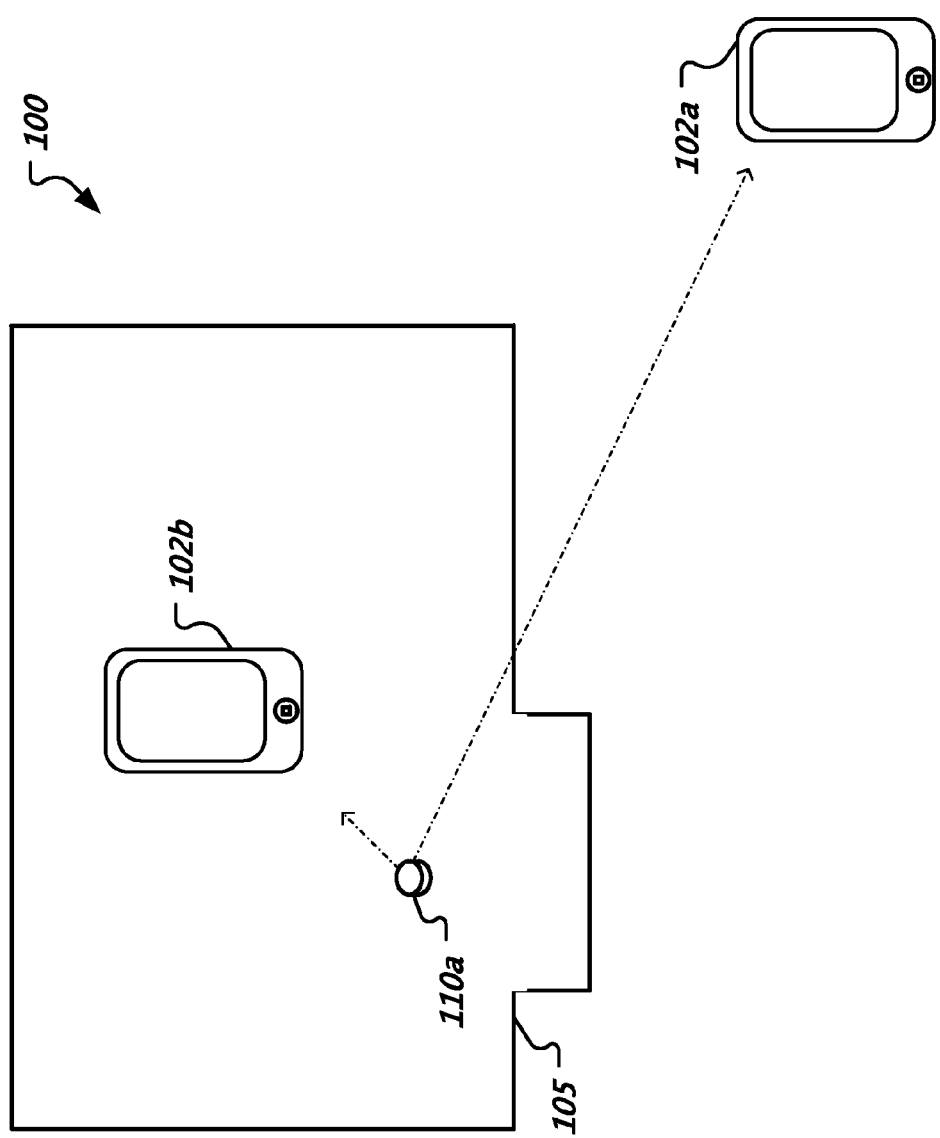

SCORING BEACON MESSAGES FOR MOBILE DEVICE WAKE-UP

CROSS REFERENCE TO RELATED APPLICATION

This patent document claims the benefit of the priority of U.S. Provisional Patent Application No. 62/057,581, filed on Sep. 30, 2014. The above-identified application is incorporated herein by reference in its entirety.

TECHNICAL FIELD

This disclosure relates generally to radio frequency (RF) beacons.

BACKGROUND

Many modern mobile devices (e.g., a smart phone, tablet computer, wearable computer) include one or more radio frequency receivers, transmitters, or transceivers that allow one-way or two-way communications with other devices. For example, a mobile device can use a transceiver to communicate with a server on the Internet via a base station of a wireless network. In another example, a mobile device can include a receiver to receive low powered RF signals from devices such as RF beacons.

SUMMARY

Techniques and systems for scoring beacon messages for mobile device wake-up determination are disclosed. A mobile device operating in a beacon-equipped operating environment can be configured to receive one or more beacon messages from one or more beacon devices and score them. In some cases, the mobile device may be in an operational state such as a low-activity state, e.g., sleep state, when a beacon message is received and scored. Based on a beacon message score and a wake-up threshold, the mobile device can determine whether to transition to an operational state that is configured for a presentation of the beacon message. In some implementations, the mobile device can transition to a nominal operational state in which content corresponding to the beacon message can be displayed on a screen. If the mobile device is already in the nominal operational state, the mobile device can remain in the nominal operational state to present the beacon message provided that the score exceeds the wake-up threshold.

A mobile device operating system can, in some implementations, run an application that monitors for beacon messages while the mobile device is in a low-activity state, or while the screen of the mobile device is powered-off, or both. In some implementations, the application can monitor and score beacon messages as a background process. The application can determine whether to wake-up the mobile device to display a received beacon message based on a scoring mechanism. However, if too many beacon messages are received by the mobile device and the mobile device is continually waking up to process the beacon messages, significant drain on the mobile device battery may occur. For example, if the mobile device user works in a mall having one or more beacon-equipped stores, the user may frequently pass by a beacon-equipped store throughout the day and the user's mobile device may wake-up each time the user passes the store due to proximity of the mobile device to a beacon device in the store. This and other scenarios can be mitigated by using a smart wake-up process, where the application or operating system of the mobile device can be configured to manage the frequency of wake-ups using a score that accounts for wake-up frequency and context, among other things. In some implementations, the score can be based on how many times the mobile device has awakened within a time period (e.g., minute(s), hour(s), or day(s)).

In some implementations, a mobile device application for interacting with a beacon-equipped operating environment can be configured to receive multiple different beacon messages and intelligently prioritize a presentation of the received beacon messages through the mobile device. Beacon messages can be prioritized based on their scores. For example, higher scores can be assigned to higher priority levels. In some implementations, beacon messages can be scored based on one or more rule sets, priority preferences, priority configurations, proximity of the mobile device to beacon devices, user or environment context, timing, message frequency, inter-beacon border rules and the like. For example, in a beacon-equipped retail store an initial "welcome to the store" beacon message may be repeatedly received by a customer's mobile device from a beacon device near a store entrance, but is desired by the store operator to be displayed on the mobile device only once in a given time period (e.g., once per day) so as not to annoy the customer with redundant displays of the same welcome message.

When the customer walks through a beacon-equipped environment with his mobile device, beacon messages broadcast from beacon devices throughout the environment can be received and prioritized by an application or operating system running on the user's mobile device and based on the prioritization are selectively presented (e.g., displayed) through the user's mobile device. Message priority can be determined based on one or more factors. In some implementations, message priority can be based on proximity to a beacon device; where messages broadcast from nearby beacon devices have a higher priority than messages broadcast from beacon devices farther away. In some implementations, message priority can be determined based on context such as a user's reason for visiting the environment. In some implementations, a message priority can be determined based on context and proximity. Context information can include a user's activities before arriving to the environment (e.g., ordered a product to pick-up, scheduled an in-store consultation, scheduled a repair drop-off/pick-up) or what a user is doing while in the environment (e.g., the type of mobile device being used, the type of device the user is interacting with) can be used to determine message priority.

In some implementations, message priority can be based on inter-beacon border rules. For example, if a user's mobile device is receiving messages from more than one beacon device then inter-beacon border rules can be used to determine which beacon message to present first. Some implementations can use priority "stickiness" to determine how to prioritize the presentation of competing beacon messages. For example, if a user's mobile device is receiving a signal from a first beacon device and someone walks between the mobile device and the first beacon device, the signal from that first beacon device may become weaker than a signal from a second beacon device. Instead of immediately switching to displaying beacon messages from the second beacon device, an application or operating system running on the mobile device determines whether to present messages from the second beacon device rather than messages from the first beacon device. The decision can be based on length of time the signal strength dropped, the magnitude of the change in signal strength, and/or other factors and contexts.

In some implementations, message priority can be based on a history of previously presented messages, including tracking a number of times a message has been presented to a mobile device user. For example, if a beacon message has already been presented, then the beacon message should not be presented again unless there is an overriding factor present, e.g., new day, phone reset, retail store application restart, etc. Beacon devices can continuously broadcast the same message throughout the day or can alternate among a group of messages. An application on a mobile device can filter the beacon messages and only present one or more pertinent messages which are based on the determined message priority. The application or operating system of the mobile device can dynamically update message priorities based on continuously changing information such as changes in a received signal strength indicator (RSSI) due to the user moving about in the store.

A technique for scoring beacon messages for mobile device wake-up can include receiving, at a mobile device in a first operational state, a beacon message from a beacon device over a short-range communication link; determining a score based on the beacon message and one or more criteria for causing a transition from the first operational state to a second operational state, the second operational state consumes more energy from a battery of the mobile device than the first operational state; determining whether the score exceeds a threshold for causing the transition; if the score does not exceed the threshold, maintaining the mobile device in the first operational state; and if the score exceeds the threshold, transitioning the mobile device to the second operational state and presenting the beacon message through the mobile device in the second operational state. Other implementations are directed to systems, devices and computer-readable, storage mediums.

These and other implementations can include one or more of the following features. Transitioning the mobile device to the second operational state can include activating a screen of the mobile device. Presenting the beacon message can include displaying content corresponding to the beacon message on the screen. Implementations can include tracking in a period of time a number of transitions that the mobile device transitions to the second operation state to present one or more beacon messages, wherein the score is based on the number of transitions. In some implementations, the score is based on whether content from the beacon message has been previously received, presented through the mobile device, or both. In some implementations, the score is based on a charge level of the battery. Implementations can include running an application as a background process on the mobile device, the application being configured to determine the score. Transitioning the mobile device to the second operational state can include operating the application to transition to a foreground process on the mobile device and display content corresponding to the beacon message on a display of the mobile device. Implementations can include determining a range estimation between the mobile device and the beacon device based on a received signal strength value corresponding to the beacon message, where the score is based on the range estimation. Determining the score can include determining whether there is a pre-existing reason for visiting a business establishment associated with the beacon device.

A system for providing beacon-based applications can include a network interface configured to communicate with mobile devices; and processor electronics configured to store applications, including an application, for download to the mobile devices via the network interface. The application can include instructions to cause a mobile device to perform operations. The operations can include receiving, in a first operational state, a beacon message from a beacon device over a short-range communication link; determining a score based on the beacon message and one or more criteria for causing a transition from the first operational state to a second operational state, wherein the second operational state consumes more energy from a battery of the mobile device than the first operational state; determining whether the score exceeds a threshold for causing the transition; if the score does not exceed the threshold, maintaining the mobile device in the first operational state; and if the score exceeds the threshold, transitioning the mobile device to the second operational state and presenting the beacon message through the mobile device in the second operational state. In some implementations, the application is configured to run as a background process while the mobile device is in the first operational state. Transitioning the mobile device to the second operational state can include operating the application to transition from the background process to a foreground process on the mobile device and display content corresponding to the beacon message on a display of the mobile device.

A mobile device can include circuitry configured to receive a beacon message from a beacon device over a short-range communication link, the beacon devices being within a vicinity of an establishment, the beacon messages being configured to provide content associated with the establishment; and a processor configured to perform operations. The operations can include receiving, in a first operational state, the beacon message via the circuitry; determining a score based on the beacon message and one or more criteria for causing a transition from the first operational state to a second operational state, wherein the second operational state consumes more energy from a battery of the mobile device than the first operational state; determining whether the score exceeds a threshold for causing the transition; if the score does not exceed the threshold, maintaining the mobile device in the first operational state; and if the score exceeds the threshold, transitioning the mobile device to the second operational state and presenting the beacon message through the mobile device in the second operational state.

Particular implementations disclosed herein provide one or more of the following advantages. Scoring beacon messages can enhance a user's experience with an application that provides an interactive experience with a beacon-equipped environment. Scoring beacon messages and filtering out low-scoring messages can reduce energy consumption by a mobile device and thereby extend the time between battery charging operations.

The details of the disclosed implementations are set forth in the accompanying drawings and the description below. Other features, objects and advantages are apparent from the description, drawings and claims.

DESCRIPTION OF DRAWINGS

FIG. 1A is a plan view of an example operating environment.

The same reference symbol used in various drawings indicates like elements.

DETAILED DESCRIPTION

Figure 1B:
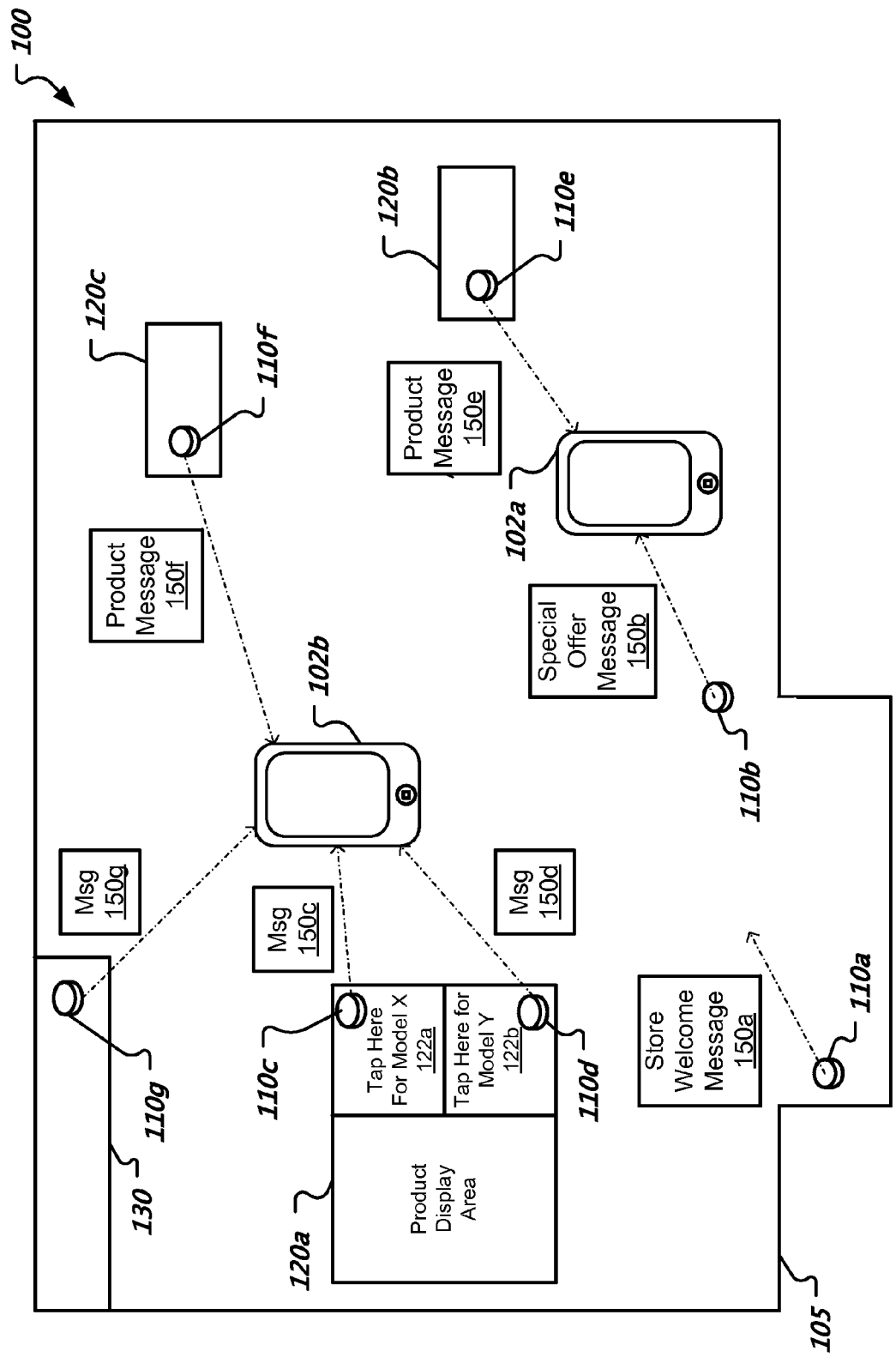
FIG. 1B is a plan interior view of an example retail store of an example operating environment.

FIG. 1A is a plan view of an example operating environment 100. In the example shown, operating environment 100 includes a retail store 105 that includes a beacon device 110a. The beacon device 110a can broadcast beacon messages to mobile devices 102a-b using a short-range communication link. Running on the mobile devices 102a-b, a retail store application can selectively present the beacon messages to users of the mobile devices 102a-b to provide the users with an interactive shopping experience. Although the example environment 100 is described herein as including a retail store, the described features and processes are applicable to any beacon-equipped environment, including museums, sports arenas, restaurants and the like. In some implementations, the retail store application interacts with an operating system of the mobile device 102a-b to perform the various processes described herein.

In some environments, a mobile device 102a-b can be barraged by beacon messages, which can lead to increased battery drain due to having to wake-up and present them. A mobile device 102a-b, for example, can be barraged by beacon messages from multiple beacon devices at the same or over a short period of time, or can be barraged by multiple beacon messages from the same beacon device over a longer period of time. Typically, useful information can be obtained through a presentation of a beacon message. However, the degree of usefulness can vary and, moreover, can be useful to some and not useful to others. For instance, if a mobile device user works nearby he may frequently pass by the retail store 105 throughout the day and his mobile device 102a may be waking up each time he passes due to repeated reception of messages from the beacon device 110a. In contrast, a mobile device user may enter the retail store 105 and be interested in having his mobile device 102b present the beacon messages. To handle these different scenarios, a mobile device 102a-b can perform a wake-up determination process. Such a process can include receiving a beacon message at a mobile device 102a-b and determining whether to wake-up in order to present the beacon message through the mobile device 102a-b. Determining whether to wake-up can include computing a beacon message score and comparing the score to a wake-up threshold value. If too many beacon messages are being received by a mobile device 102a-b and it is continually waking up to present them, increased battery drain may result. Thus, a wake-up determination process can be used to prevent battery drain by managing the frequency of device wake-ups. Managing the frequency of device wake-ups can include limiting beacon-based wake-ups to high scoring messages. In some implementations, a beacon message score can be based on proximity to a beacon device, wake-up frequency, message context, message content, battery charge level, or a combination thereof. In some implementations, a beacon message score can be based on how many times the mobile device 102a-b has been woken in a period of time such as a minute, hour, day, or week. Note that different mobile devices 102a-b can make separate determinations of a score for a beacon message received from the beacon device 110a.

FIG. 1B is a plan interior view of an example retail store 105 of the example operating environment 100. In the example shown, operating environment 100 includes a retail store 105 that includes beacon devices 110a-g. The beacon devices 110a-g can broadcast beacon messages 150a-g to mobile devices 102a-b using short-range communication links. On the mobile devices 102a-b, a retail store application can present beacon messages to users of the mobile devices 102a-b to provide the users with an interactive shopping experience.

The beacon devices 110a-g can be configured (locally or remotely over a network) to transmit messages that provide information related to the retail store 105 or events (e.g., advertising campaigns) occurring at the retail store 105. For example, beacon device 110a can transmit a store welcome message 150a and beacon device 110b can transmit a special offer message 150b. In some implementations, a beacon message includes a message number that the retail store application can map to content such as a text message for display on a screen of the mobile device 102a-b. In some implementations, the content (e.g., a database table) can be downloaded from a network-based server computer to the mobile device when the user first enters the retail store 105.

In some implementations, the retail store 105 can include beacon-equipped product demonstration tables 120a-c. For example, a table 120a can include a product display area and product information placards 122a-b having beacon devices 110c-d configured to broadcast respective beacon messages 150c-d corresponding to the respective products identified by the placards 122a-b. In some implementations, such beacon messages 150c-d provide additional information about the respective products. In some implementations, such beacon messages 150c-d trigger a process for the user to order or customize the product using the retail store application. In some implementations, the beacon devices 110c-d can be fixed to or embedded inside of the information placards 122a-b. If a user taps or swipes a mobile device 102a-b on or near one of the beacon devices 110c-d, thereby selecting the product model associated with the corresponding placard 122a-b, the retail store application causes a display of a message associated with the user-selected one of the placards 122a-b, i.e., beacon devices 110c-d. The retail store 105 can include additional tables 120b-c each equipped with beacon devices 110e-f that are configured to broadcast beacon messages 150e-f associated with the respective products being displayed on the tables 120b-c. Further, the retail store 105 can include a customer care center 130 that is equipped with a beacon device 110g that is configured to broadcast a beacon message 150g associated with the center 130.

The beacon devices 110a-g and the mobile devices 102a-b can use a short-range radio technology such as Bluetooth™ or a near field communication (NFC) technology for broadcasting and/or receiving beacon messages. In some implementations, the beacon devices 110a-g can use a specific type of Bluetooth™ called Bluetooth™ low energy (BLE). A wireless communication range of the beacon devices 110a-g can be between 10 to 30 meters. Other ranges are possible. When a mobile device 102a-b is within a wireless communication range of a beacon device 110a-g, it can receive a corresponding beacon message.

Various examples of mobile devices 102a-b include smartphones, tablet computers, notebook computers, or wearable computers. In some implementations, the mobile devices 102a-b can include a wireless receiver or transceiver that can scan the environment 100 for beacon messages from other devices, such as beacon devices 110a-g, in the environment 100. For example, a mobile device 102a-b can include a BLE receiver that scans for beacon messages. The mobile devices 102a-b can communicate with servers using a base station of a wireless network such as one based on Long Term Evolution (LTE) or Code Division Multiple Access (CDMA), e.g., CDMA2000 and Wideband CDMA (WCDMA). Other types of wireless networks are possible.

Figure 2:
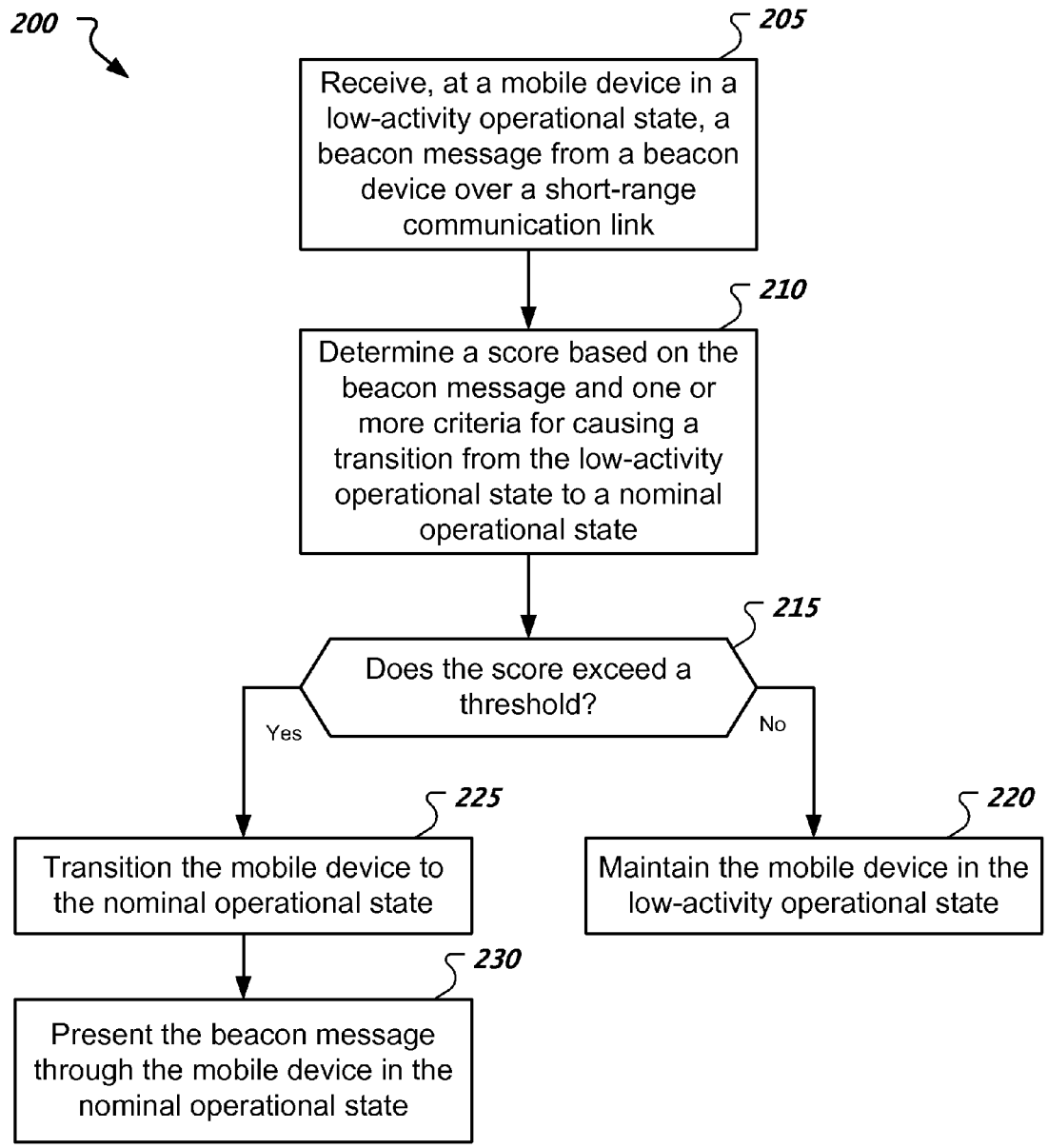
FIG. 2 illustrates an example process performed by a mobile device for scoring a beacon message for a wake-up determination.

FIG. 2 illustrates an example process 200 performed by a mobile device for scoring a beacon message for a wake-up determination. In some implementations, the process 200 can begin by receiving, at a mobile device in a low-activity operational state, a beacon message from a beacon device over a short-range communication link (205). In some implementations, the process 200 performs a periodic scan for beacon messages from beacon devices that are in the vicinity of the mobile device. As used herein, "in the vicinity" means the mobile device is physically close enough to the beacon device to receive RF signals transmitted by the beacon device. For example, a wireless transceiver on the mobile device can initiate a short-range scan for RF signals such as BLE RF signals or NFC RF signals.

The process 200 determines a score based on the beacon message and one or more criteria for causing a transition from the low-activity operational state to a nominal operational state (210). Various examples of criteria include but are not limited to: battery-based criteria; proximity-based criteria; context-based criteria; content-based criteria; and timing criteria. Other types of criteria are possible. A score can be a numerical value. In some implementations, using context-based criteria can include determining whether there is a pre-existing reason for a visit to a store associated with the beacon message. In some implementations, using content-based criteria can include determining a content-based priority level associated with the beacon message. In some implementations, using battery-based criteria can include determining a charge level associated with a battery of the mobile device. In some implementations, a score can be lowered if the battery is in a low-charge-level range. For example, it would take a message with a higher content-based priority level to compensate for a battery being in a low-charge-level range.

In some implementations, the process 200 can determine a score based on one or more proximity-based criteria such as a range estimation between the mobile device and a beacon device. Estimating the range between the mobile device and a beacon device can include using one or more received signal strength values corresponding respectively to one or more beacon messages. In some implementations, process 200 collects RF signal measurements for two or more beacon messages that have the same type or content, computes RSSI values for each of these beacon messages, and performs an average over the RSSI values to compute an average RSSI value. In some implementations, an RSSI can be mathematically defined as being approximately a ratio of the power of a received signal and a reference received power (e.g., 1 mW), where the higher the RSSI number (or less negative) the stronger the signal. In some implementations, a RSSI value can be expressed in dBm. Based on a predetermined transmission power for transmitting beacon messages, range estimation can be computed based on the RSSI value. Determining range estimations can include using channel quality information such as a bit error rate (BER) or a packet error rate (PER) derived from a received beacon message. In some implementations, a beacon message from a beacon device that is closer to the mobile device can produce a higher score than a message from a beacon device that is farther away from the mobile device.

The process 200 determines whether the score exceeds a threshold (215). If the score does not exceed the threshold, the process 200 maintains the mobile device in the low-activity operational state (220). Maintaining the mobile device in the low-activity operational state can include keeping the mobile device in a low-power state. Maintaining the mobile device in the low-activity operational state can include not presenting the beacon message to a user of the mobile device. In some implementations, maintaining the mobile device in the low-activity operational state can include disregarding the beacon message such that it is not displayed on a screen of the mobile device. However, the process 200 can store information based on a received beacon message, whether disregarded or not, in a data structure for use in determining a score for a subsequently received message. For example, a score can be based on a frequency of reception of beacon messages that have the same content.

If the score exceeds the threshold, the process 200 transitions the mobile device to the nominal operational state (225). The nominal operational state can consume more energy from a battery of the mobile device than the low-activity operational state. For example, the low-activity operational state can be a sleep state, in which a screen of the mobile device can be off or in a low-power mode, e.g., a backlight of the display is off. The nominal operational state can be a state in which a screen of the mobile device is powered-on, e.g., a backlight of the display is activated. In some implementations, transitioning the mobile device to the nominal operational state can include activating a screen of the mobile device. In some implementations, transitioning the mobile device to the nominal operational state can include activating an audio and/or force feedback mechanism of the mobile device. In some implementations, transitioning the mobile device to the nominal operational state can include increasing a clock frequency of a mobile device processor.

Based on the transition, the process 200 presents the beacon message through the mobile device in the nominal operational state (230). Presenting the beacon message can include displaying information corresponding to the beacon message on a screen of the mobile device. In some implementations, presenting the beacon message can include providing one or more notifications. A presentation of a beacon message can include a force feedback (e.g., vibration indication), audio output (e.g., beep, music, etc.), visual output (e.g., flashing light), or a combination thereof. In some implementations, beacon messages can include any content including but not limited to: text, graphics, digital images, audio, video, and animation. Beacon messages can be presented on the mobile device in the form of audio output to work with mobile devices without display capability or to assist visually impaired users. In some implementations, presenting the beacon message can include retrieving content corresponding to one or more values included in the beacon message; and displaying the content on the screen.

Figure 3A:
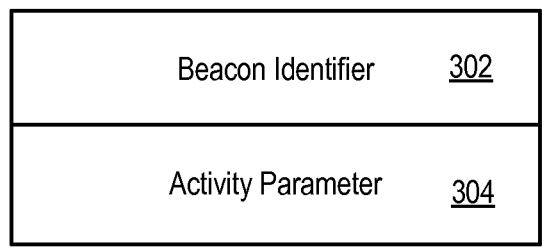
FIGS. 3A, 3B, and 3C illustrate different examples of beacon message formats.
Figure 3B:
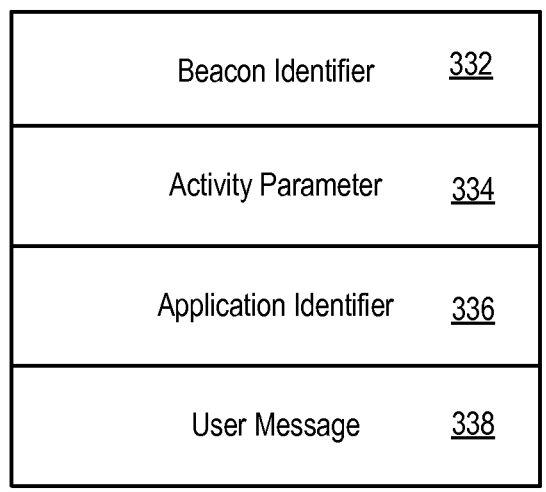
Figure 3C:
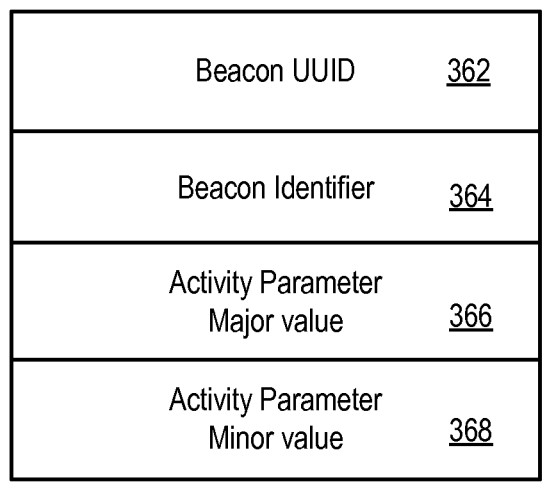

FIGS. 3A, 3B, and 3C illustrate different examples of beacon message formats. In FIG. 3A, the format 300 includes a beacon identifier 302 and an activity parameter 304. A beacon identifier 302 can include a text string such as "com.company.retailstore_no_3954" or a hexadecimal value such as "0x0e33de54." Other types of identifiers are possible. In some implementations, the activity parameter 304 can include an action value or string. In some implementations, the activity parameter 304 can include a message value or string. Other types of activity parameters are possible.

In FIG. 3B, the format 330 includes a beacon identifier 332, activity parameter 334, application identifier 336, and a user message 338. The application identifier 336 can identify an application running on the mobile device for handling the beacon message upon reception at a mobile device. For example, an operating system running on the mobile device can use the application identifier 336 to forward the beacon message to an application corresponding to the application identifier 336. In some implementations, if the application is not already installed on the mobile device, a browser can be launched on the mobile device and direct the user (e.g., using a URL) to a website where the user can download and install the application corresponding to the application identifier 336. In some implementations, the application can be downloaded automatically without user intervention in a manner that is transparent to the user (e.g., as a background process). In some implementations, if the application is installed but not running on the mobile device, the application can be launched automatically by the operating system running on the mobile device to receive the beacon message.

In FIG. 3C, the format 360 includes a beacon universally unique identifier (UUID) 362, beacon identifier 364, activity parameter major value 366, and activity parameter minor value 368. A venue can include multiple beacon devices having the same beacon identifier 364. However, such beacons can have different values for the beacon UUID 362. Thus, the beacon UUID 362 can serve to differentiate among beacon devices sharing the same beacon identifier 364. In some implementations, the beacon identifier 364 includes the beacon UUID 362. In some implementations, the UUID 362 is a 128-bit value.

An activity parameter can be split between a major value 366 and a minor value 368. In some implementations, the major value 366 and a minor value 368 are different 16-bit portions of a 32-bit value. In some implementations, the minor value 368 specifies a subtype from a group associated with the major value 366. For example, the major value 366 can specify a value associated with displaying user messages, and the minor value 368 can specify which user message to display.

In some implementations, an application running on a mobile device can process the major value 366 and the minor value 368 based on an internal database that associates major and minor values with specific actions. In some implementations, the internal database includes information from a JavaScript Object Notation (JSON) based file or data stream containing attribute-value pairs, e.g., one or more records containing a beacon identifier, major value, minor value, and an action-response such as a text string for displaying to a user. For example, a JSON based file can include the following text:

```
{
  "beaconUUID": "B3F56DB5-EFFB-58D2-C060-C0F5F81096E5",
  "beaconIdentifier": "com.retailstore__no__3954",
  "beacons": [{
    "major": 1,
    "minor": 99,
    "action": "message",
    "url": "",
    "message": {
      "en": "Welcome to the Store!"}
  }, {
    "major": 3,
    "minor": 2,
    "action": "url",
    "url": "https://retailstore.com/us/modelx-info",
    "message": {
      "en": "Interested in the Model X? Click on link for more information"}
  }]
}
```

This example JSON file snippet includes different actions associated with different major and minor values for a beacon UUID and identifier pair. Based on receiving a major and minor value from the beacon device associated with the beacon UUID and identifier pair, a mobile device would perform the action associated with the corresponding major and minor value entry within the JSON file.

Figure 4:
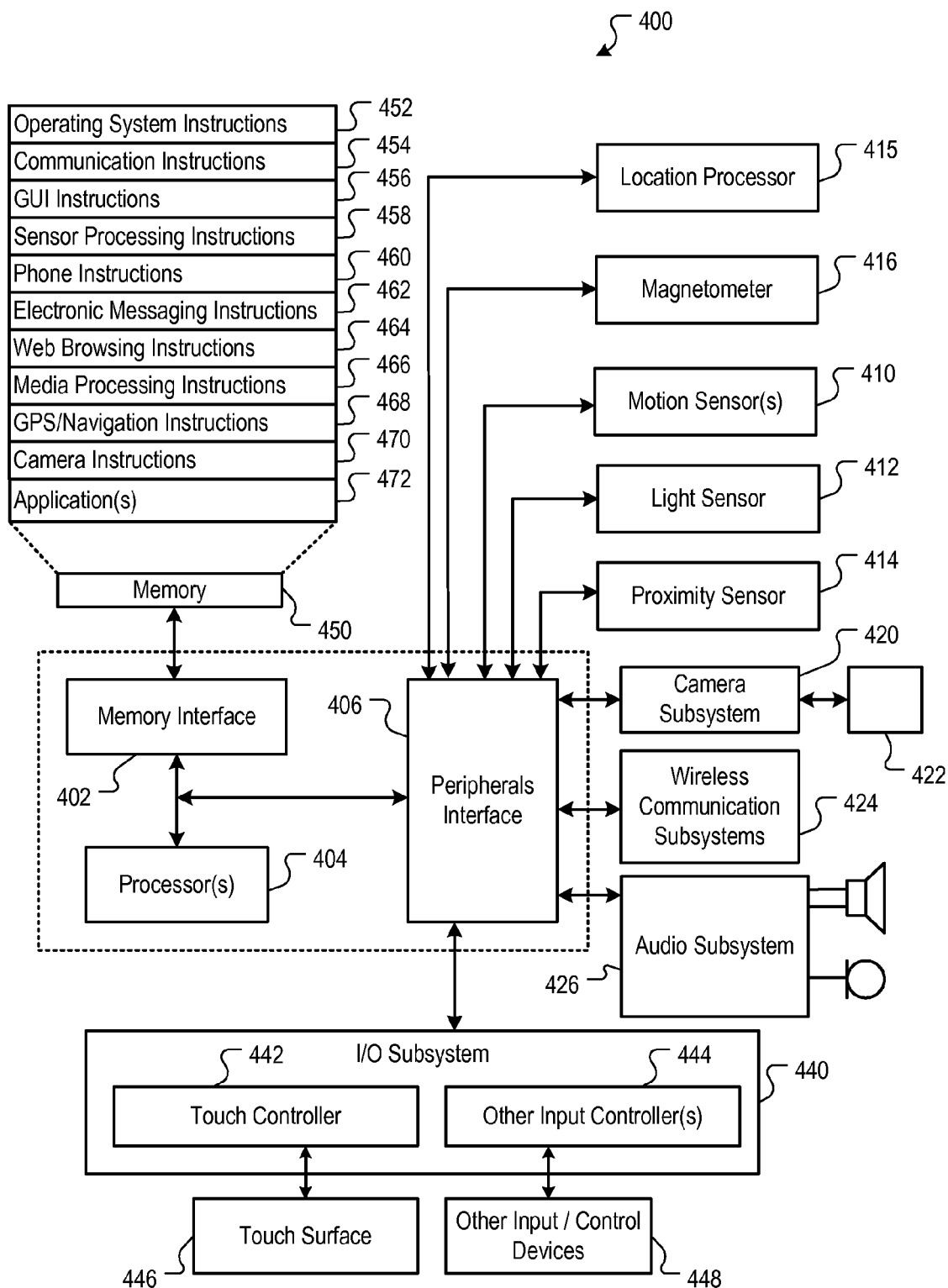
FIG. 4 is a block diagram of example mobile device architecture.

FIG. 4 is a block diagram of example mobile device architecture. The architecture may be implemented in any device 400 for generating the features described in this specification, including but not limited to portable computers, smart phones and electronic tablets, game consoles, wearable devices and the like. Device 400 may include memory interface 402, data processor(s), image processor(s) or central processor(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape). Other sensors may also be connected to peripherals interface 406, such as a temperature sensor, a biometric sensor, or other sensing device, to facilitate related functionalities. Location processor 415 (e.g., GPS receiver chip) may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass. Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. Audio subsystem 426 may be coupled to a speaker 428 and one or more microphones 430 to facilitate voice-enabled functions, such as voice recognition, voice replication, digital recording, and telephony functions.

Communication functions may be facilitated through one or more communication subsystems 424. Communication subsystems 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 424 may depend on the communication network(s) or medium(s) over which the device 400 is intended to operate. For example, a device may include wireless communication subsystems designed to operate over LTE, GSM, a GPRS network, an enhanced data GSM environment (EDGE) network, 802.x communication networks (e.g., Wi-Fi, Wi-Max), CDMA networks, NFC and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and application storage 472 for storing applications, such as a retail store application that is configured to receive, score, and prioritize beacon messages if required. In some implementations, such applications can be pre-installed on the device 400, downloaded from an application store server, or a combination thereof. The retail store application can include a rules-based engine that processes beacon messages according to rule sets, as described herein.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Figure 5:
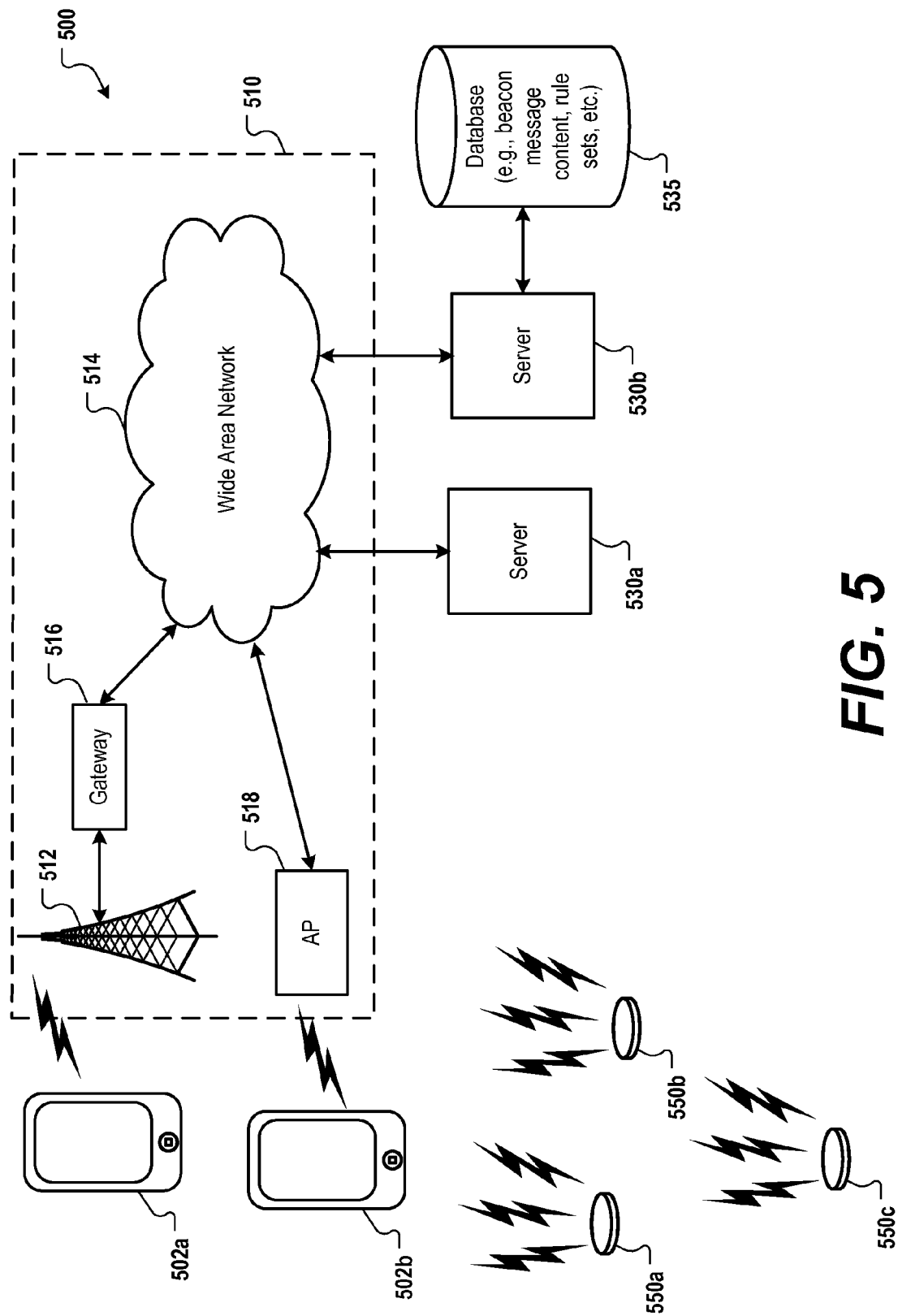
FIG. 5 illustrates an example operating environment for handling beacon messages.

FIG. 5 illustrates an example operating environment for handling beacon messages. Mobile devices 502a-b, for example, can communicate over one or more wireless networks. For example, a base station 512 of a wireless network, e.g., a cellular network, can communicate with a wide area network (WAN) 514, such as the Internet, by use of a gateway 516. Likewise, an access point (AP) 518, such as an IEEE 802.11 family based wireless access point, can provide communication access to the wide area network 514. The mobile device 502a-b can, for example, communicate with one or more servers 530a-b via the base station 512, access point 518, or combination thereof. The servers 530a-b can include a network interface configured to communicate with devices such as the mobile devices 502a-b. The servers 530a-b can include processor electronics configured to communicate with devices such as the mobile devices 502a-b via the network interface using a protocol such as Transmission Control Protocol (TCP) or User Datagram Protocol (UDP).

Mobile devices 502a-b can also receive beacon messages over a short-range communication link from a beacon device 550a-c. In some implementations, the short-range communication link can be based on Bluetooth radio technology. In some implementations, the short-range communication link can be based on NFC radio technology. In some implementations, the mobile devices 502a-b can be configured to continuously scan for beacon messages. In some implementations, the mobile devices 502a-b can be configured to scan for beacon messages for a predetermined time period based on an application invoking a beacon scan API. Based on receiving one or more beacon messages over short-range communication links from one or more beacon devices 550a-c, the mobile devices 502a-b can determine beacon message scores. In some implementations, the mobile devices 502a-b can prioritize beacon messages for presentation based on their corresponding scores.

In some implementations, based on receiving a beacon message over a short-range communication link from a beacon device 550a-c, the mobile devices 502a-b can establish communications with one or more servers 530a-b via a long-range communication link associated with a base station 512 that provides cellular data services. For example, a beacon message from a beacon device 550a-c can cause the mobile devices 502a-b to retrieve a retail store application from a first server 530a. In some implementations, the mobile devices 502a-b have already retrieved and are running the retail store application before receiving the beacon message from the beacon device 550a-c. The retail store application can be configured to download beacon message content from a second server 530b. In some implementations, the retail store application can download beacon message content from the second server 530b in response to an initial reception of a beacon message such as a welcome message. Further, the retail store application can be configured to download one or more message rule sets from the second server 530b. The message rule sets can be used to determine beacon message scores, priorities, or both.

In some implementations, the second server 530b can store data such as beacon message content and message rule sets in a database 535. In some implementations, the beacon message content includes mappings between beacon message values (e.g., identifier, major, and/or minor values) and corresponding message data (e.g., text, picture, video, and/or audio). After downloading the beacon message content from the second server 530b, the mobile devices 502a-b can use the mappings and message texts to translate a received beacon message into a format that is suitable for display to users of the mobile devices 502a-b. In some implementations, beacon message content can be stored as a document within the database 535 such as an Extensible Markup Language (XML) document or a JSON document. Other document types are possible. In some implementations, the second server 530b provides the entire beacon message content document to the mobile devices 502a-b. In some implementations, message rule sets can be stored as a document within the database 535 such as an XML document or a JSON document. Other document types are possible. In some implementations, the second server 530b includes processor electronics configured to store applications, including a retail store application, for download to the mobile devices 502a-b.

Beacon devices 550a-c can include circuitry such as a processor, memory, transmitter for broadcasting beacon messages, and an interface for programming the beacon devices 550a-c, which can be a USB interface or a two-way wireless interface such as an LTE or IEEE 802.11 based network interface. In some implementations, the beacon devices 550a-c can be programmed to periodically update data within the beacon messages. The beacon device 550a-c can transmit different action codes, e.g., different message values, at different times during the day. Such codes, for example, can include a first message value for announcing an in-store event that starts in 15 minutes, and for after the event, a second message value for retrieving product information for a product featured during the in-store event.

Figure 6:
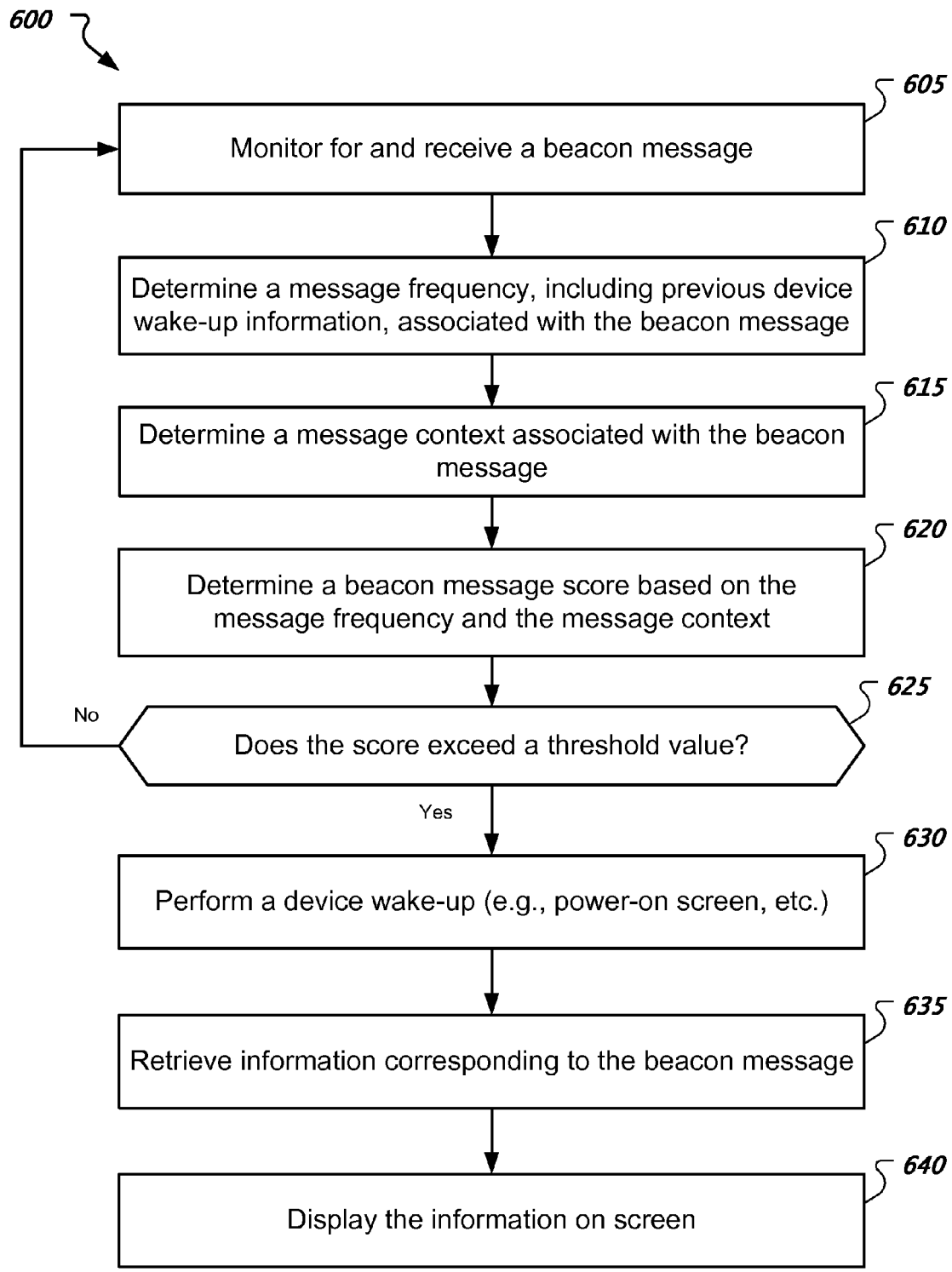
FIG. 6 illustrates an example process performed by a mobile device using a beacon message score.

FIG. 6 illustrates an example process 600 performed by a mobile device using a beacon message score. The process 600 monitors for and receives a beacon message (605). The process 600 determines a message frequency associated with the beacon message (610). Determining a message frequency can include determining how many times the same beacon message has been received within a time period. In some implementations, determining a message frequency can include updating a previously determined message frequency based on newly received messages. In some implementations, determining message frequency can include determining previous device wake-up information such as whether the device has been previously woken to display a previously received version of the beacon message.

The process 600 determines a message context associated with the beacon message (615). Determining a message context can include determining a reason code. In some implementations, determining a message context can include accessing a calendar stored on the mobile device and determining whether there is a calendar event associated with a business establishment, where the business establishment is associated with the beacon message. In some implementations, determining a message context can include determining whether an application such as a retail store application has been launched.

The process 600 determines a beacon message score based on the message frequency and the message context (620). In some implementations, a beacon message score can be computed based on a summation of multiple weighted components such as a context component and a frequency component. In some implementations, a message context component can be based on a reason code that is determined by a retail store application. For example, if a reason code indicates that the mobile device user is likely to benefit from a display of the message (e.g., the mobile device user has a scheduled appointment at the store), then assign a high context component value; otherwise, if a reason code indicates an null reason (i.e., no reason was found), then assign a low or zero context component value. In some implementations, message frequency information including previous device wake-up information can be another component of the beacon message score. For example, if the mobile device has already been woken to display a previously received version of the beacon message, a frequency component of the beacon message score can take on a low or zero value; if the mobile device has not previously received the beacon message, then the frequency component can take on a high value.

The process 600 determines whether the beacon message score exceeds a threshold value (625). In some implementations, the threshold value is determined based on a user-configurable parameter. In some implementations, the threshold value is selected based on a remaining charge of the mobile device's battery. For example, if the battery's charge is running low, then the threshold value can be set higher to minimize device wake-ups, and thereby conserve charge. If not exceeded, the process continues to monitor for and receive beacon messages (605). If exceeded, the process performs a device wake-up (630). Performing a device wake-up can include powering-on a screen of a mobile device. The process retrieves information corresponding to the beacon message (635). Retrieving information can include accessing a message text string corresponding to a message value included in the beacon message. The process displays the information on screen (640).

Figure 7:
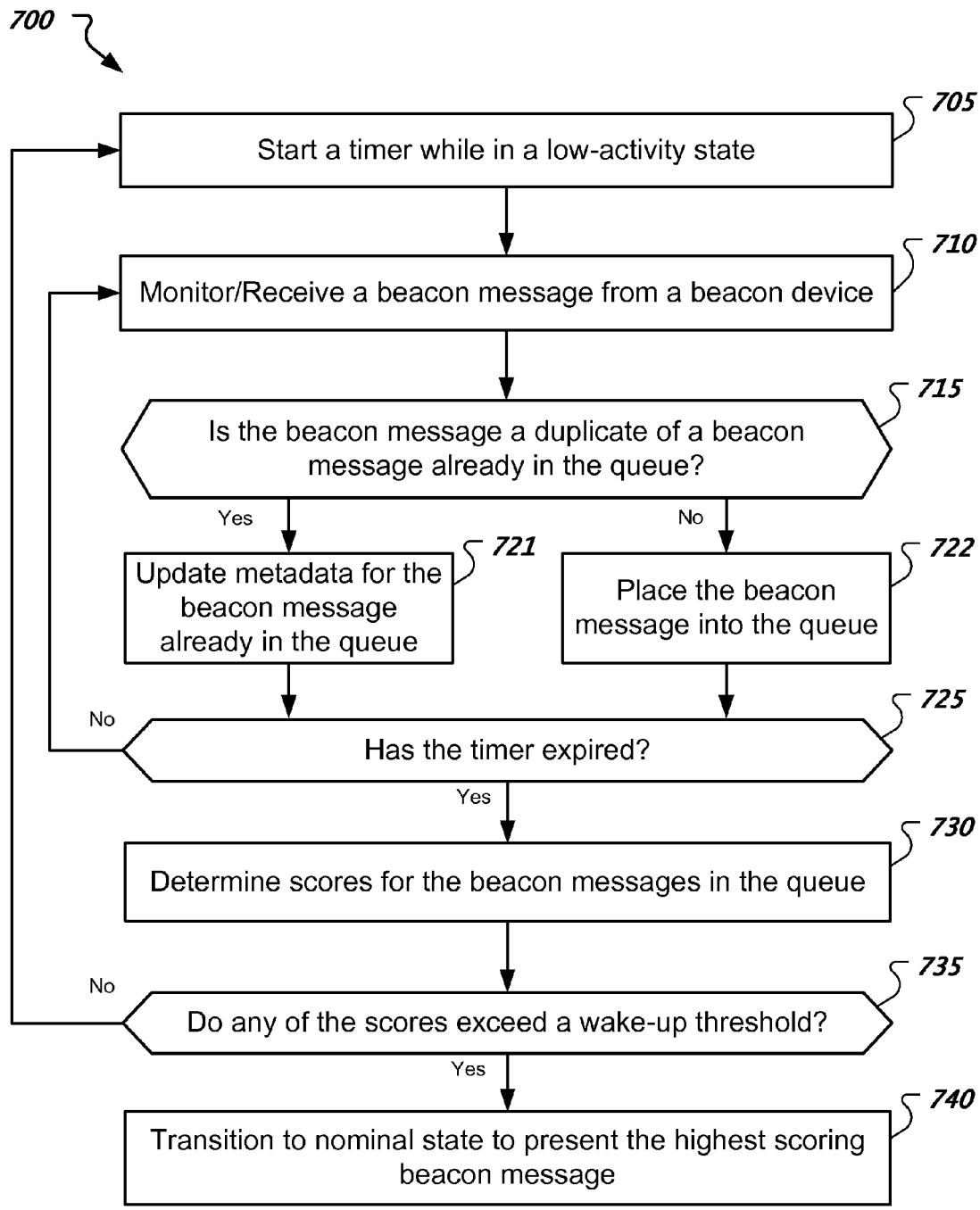
FIG. 7 illustrates an example process performed by a mobile device that uses a queue to process and score beacon messages.

FIG. 7 illustrates an example process 700 performed by a mobile device that uses a queue to process and score beacon messages. The process 700 starts a timer while in a low-activity state (705). In some implementations, a duration of the timer is based on a predetermined value such as 20 milliseconds, 60 milliseconds, etc. The process 700 monitors for and receives a beacon message from a beacon device (710). The process 700 determines whether the beacon message is a duplicate of a beacon message already in the queue (715). If it is a duplicate, the process 700 updates metadata for the beacon message already in the queue (721), otherwise the process 700 places the beacon message into the queue (722). In some implementations, updating metadata can include incrementing a duplicate message counter in a metadata record. In some implementations, updating metadata can include adding an RSSI value of the duplicate beacon message to a metadata record. The process 700 determines whether the timer has expired (725). If the timer has not expired, the process 700 loops and monitors for additional beacon messages (710). If the timer has expired, the process 700 determines scores for the beacon messages in the queue (730). The process 700 determines whether any of the scores exceed a wake-up threshold (735). If at least one score exceeds the wake-up threshold, then the process 700 transitions the mobile device to a nominal state to present the highest scoring beacon message (740). If no score exceeds the wake-up threshold, then the process 700 re-starts the timer (705) to monitor for additional beacon messages. In some implementations, the queue is emptied based on a re-start of the timer. In some implementations, one or more messages in the queue are scored automatically based on an expiration of the timer.

Figure 8:
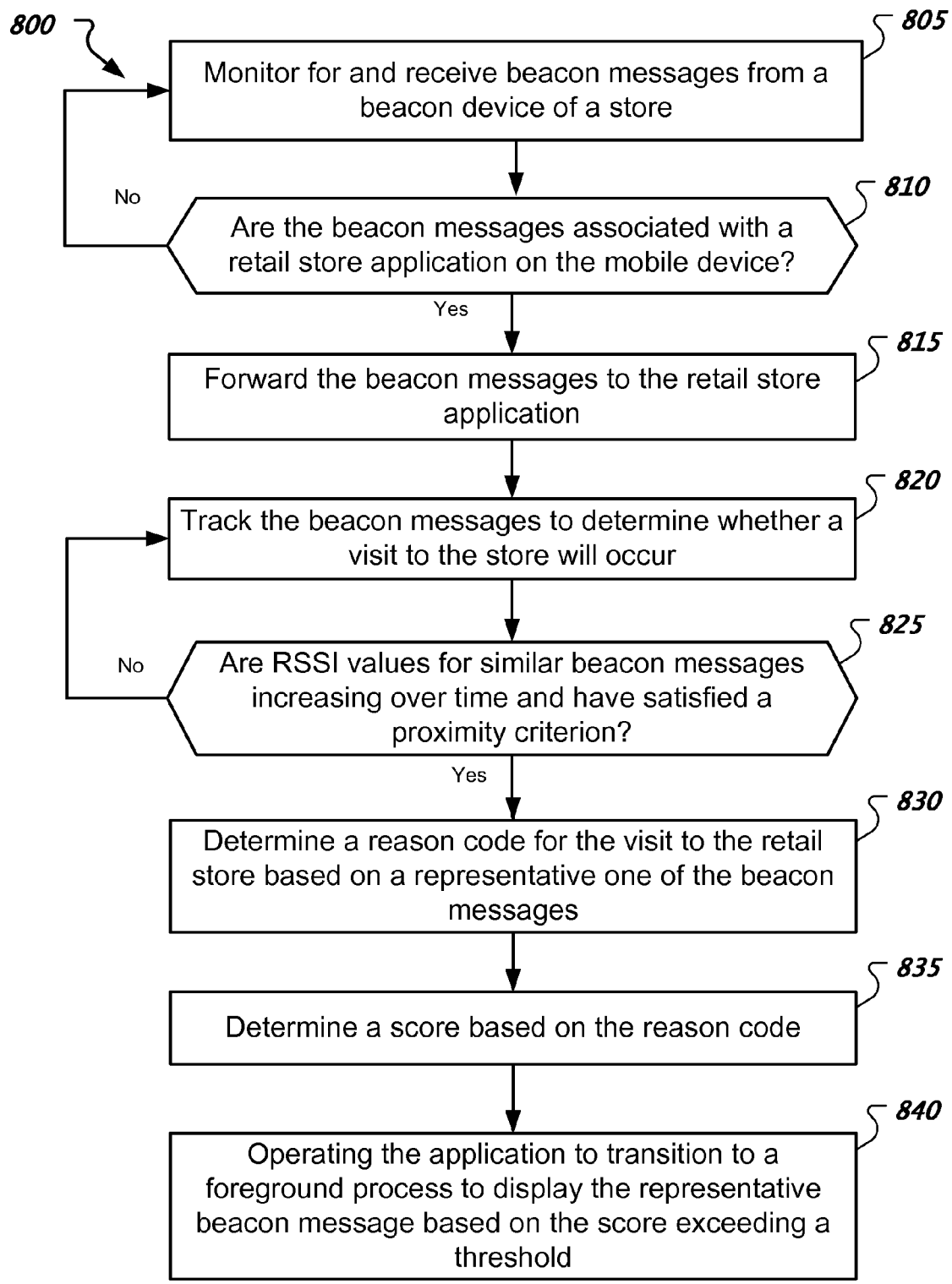
FIG. 8 illustrates an example process performed by a mobile device that performs beacon message scoring based on message context.

FIG. 8 illustrates an example process 800 performed by a mobile device that performs beacon message scoring based on message context. The process 800 monitors for and receives beacon messages from a beacon device of a store (805). The process 800 determines whether the beacon messages are associated with a retail store application on the mobile device (810). In some implementations, this association determination is based on whether the retail store application has registered itself via an API to obtain any beacon messages received by the mobile device. In some implementations, this association determination is based on accessing an application identifier (App ID) contained within a beacon message and determining whether the application identifier matches an application that is installed on the mobile device. If the messages are not associated, the process 800 continues to monitor for beacon messages (805). If the messages are associated, the process 800 forwards the beacon messages to the retail store application (815). At this point, the retail store application can be operating as a background process. In some implementations, forwarding the beacon messages can include sending a separate notification to the application for each of the beacon messages.

Within the process running the retail store application, the process 800 tracks the beacon messages to determine whether a visit to the store will occur (820). Tracking the beacon messages can include storing the beacon messages in a data structure such as a table, an array, queue, or linked-list. The process 800 determines whether RSSI values for similar ones of the beacon messages are increasing over a period of time and have satisfied a proximity criterion (825). For example, the process 800 can compare received signal strength values associated with at least a portion of the beacon messages to determine whether the received signal strength values are increasing with time, which may indicate that the user is walking towards an entrance of the retail store, where a beacon device is located near the store's entrance. In some implementations, similar ones of the beacon messages are messages having the same message type, content, or both. In some implementations, determining when a proximity criterion is satisfied can include tracking range estimations of the beacon messages and identifying when a range estimation is less than a threshold value.

If the user of the mobile device is not about to visit, the process 800 continues to track the beacon messages (820). If the user of the mobile device is about to visit, the process 800 determines a reason code for the visit to the retail store based on a representative one of the beacon messages (830). In some implementations, the process 800 can access a database, such as a user's calendar database or the retail store's appointment log, to determine whether the user has an appointment at the retail store. Various examples of reason codes include codes for package pick-up, service consultation, targeted browsing, general browsing, or non-specified. Other types of codes are possible. In some implementations, a general browsing code is used as a default code. In some implementations, a null code is used as a default code.

The process 800 determines a score based on the reason code (835). In some implementations, determining a score can include selecting and applying a rule set to determine a score based on the reason code and the representative one of the beacon messages. Various examples of rule sets include a package pick-up rule set, service consultation rule set, general browsing rule set, or a non-specified visit rule set. In some implementations, the process 800 applies the rule set to determine a score of a beacon message. In some implementations, a rule set includes a list of message types and corresponding priority values, score values, or both. A package pick-up rule set, for example, can cause beacon messages associated with general solicitations such as specials of the day to have a lower score, or a lower context component score, than beacon messages associated with a package pick-up such as messages that provide instructions for the pick-up. In contrast, a general browsing rule set can assign beacon messages associated with general solicitations to have a higher score, or a higher message context component score, than beacon messages associated with a beacon device at a package pick-up kiosk that is providing instructions about pick-up. In another example, a targeted browsing rule set, if applied, may cause a beacon message associated with a product that is on the user's wish list to have a higher score than a beacon message associated with a product that is not on the user's wish list. In some implementations, a user's wish list is stored within a data structure managed by the retail store application.

The process 800 operates the retail store application to transition to a foreground process to display the representative beacon message based on the score exceeding a threshold (840). In some implementations, transitioning to a foreground process can be based on an application performing an action such as causing information to be displayed on a screen. In some implementations, transitioning to a foreground process can be based on an application invoking a foreground transition via an API call.

Figure 9:
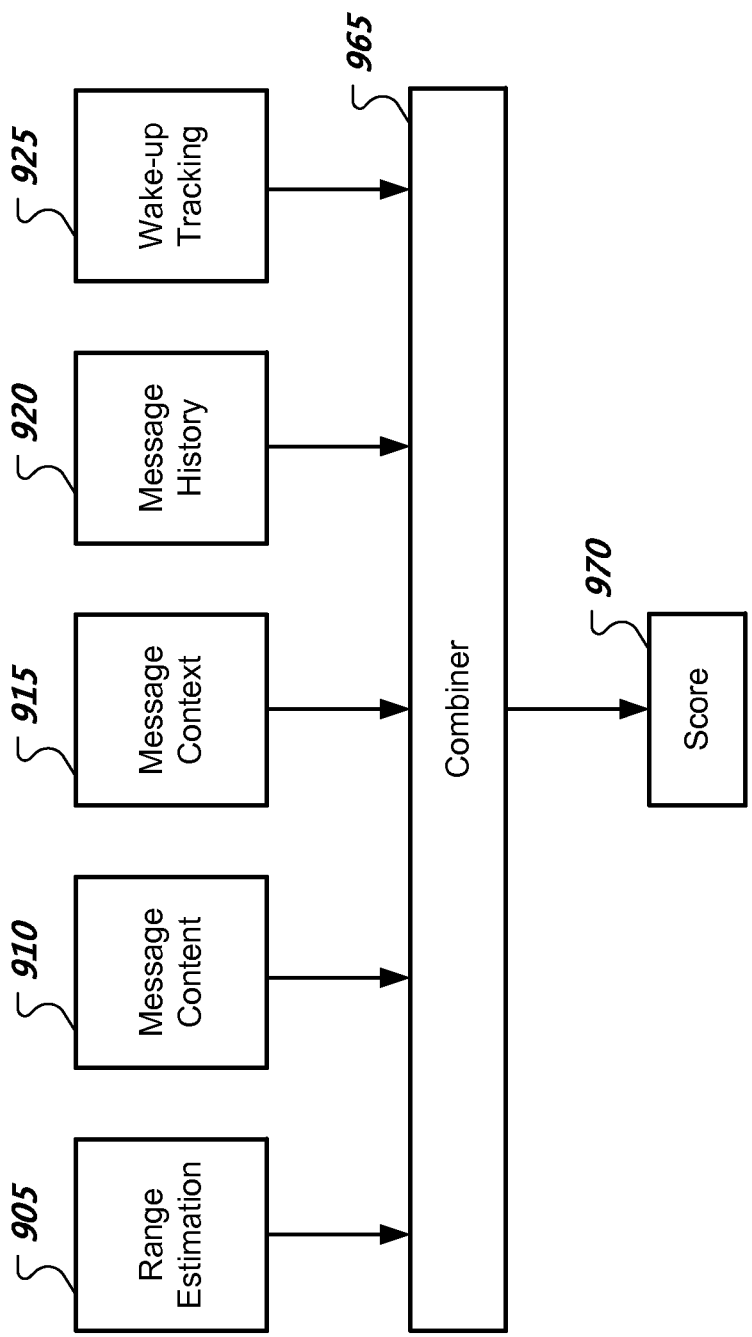
FIG. 9 illustrates an example of a beacon message score determination process performed by a mobile device that uses a combination of component scores to produce a score.

FIG. 9 illustrates an example of a beacon message score determination process performed by a mobile device that uses a combination of component scores to produce a score. A score 970 for a received beacon message can be based on one or more components, which can be referred to as sub-scores, such as a range estimation component 905, message content component 910, message context component 915, message history component 920, and a wake-up tracking component 925. A combiner 965 can combine the range estimation component 905, message content component 910, message context component 915, message history component 920, and a wake-up tracking component 925 to form a score 970. In some implementations, the combiner 965 performs a weighted summation of the components. For example, each component is multiplied by a corresponding weight, and the weighted components are then summed to produce the score 970. Other types of combining operations are possible. In some implementations, more or less components can be combined to produce a score.

A range estimation component 905 can be based on an RSSI value associated with a beacon message. A received signal from a closer beacon device is typically stronger than a signal from a beacon device that is farther away assuming that both beacon devices transmit at the same power level. In some implementations, a beacon device can be configured to broadcast messages at periodic time intervals, e.g., every 25 milliseconds. In some implementations, a range estimation component 905 can be based on averaging two or more RSSI values associated with two or more beacon messages from the same beacon device, e.g., using beacon messages that have the same beacon identifier.

In some implementations, a range estimation component 905 can be based on a range class that is determined for a received beacon message. A range class can provide an approximate distance range between a mobile device and an RF signal source, such as a beacon device. Determining a range estimation component 905 can include assigning a range class to a received beacon message. For example, an RSSI value associated with a received beacon message can be assigned to a range class based on RSSI thresholds without converting the RSSI values to distances. In some implementations, range classes include: Immediate, Near, Far, and Unknown. For scoring, range classes can be assigned predetermined values. In some implementations, an immediate range class is assigned to a higher value to produce a higher range estimation component value than other classes such as Near, Far, and Unknown. More or fewer range classes can be used as needed for an application.

In some implementations, the Immediate range class can be defined as a range between a mobile device and an RF signal source that is, e.g., 0 to 30 centimeters. The Near range class can be defined as a range between a mobile device and an RF signal source that is, e.g., 30 centimeters to 4 meters. The Far range class can be defined as a range between a mobile device and an RF signal source that is, e.g., 4 to 30 meters. The Unknown range class can be defined as the range between a mobile device and a signal source (e.g., greater than 30 meters). Distance thresholds can separate the range classes. The distance thresholds (e.g., in meters) can be converted to RSSI thresholds in dBm to enable classification of RSSI values, where the range classes are separated by RSSI thresholds. In some implementations, a mobile device can be configured to assign priority classes to beacon messages based on their correspondingly assigned range classes. For example, a high value for a range estimation component 905 can be assigned to a message in an Immediate range class, whereas a low value can be assigned to a message in a Far range class.

A message content component 910 can be based on a content type of a received beacon message. Different content types can be assigned different values. In some implementations, the assignment between content type and value can be based on a rule set. For example, a rule set can assign a higher value for the message content component 910 to a special offer message, while assigning a lower value to a general welcome message. A message context component 915 can be based on whether there is a pre-existing reason for visiting a business establishment associated with the beacon device. In some implementations, a message context component 915 is based on a reason code.

A message history component 920 can be based on whether content from the beacon message has been previously received, presented through the mobile device, or both. For example, if content from the beacon message has been previously received and presented through the mobile device within the last N hours, then the message history component 920 can be set to indicate that the message should not be displayed again, which in some implementations, can be zero. In some implementations, if the message was previously presented within the last N hours, the score 970 can be set to zero regardless of the other component contributions such that the mobile device would not make a transition in response to the message. In some implementations, N is a user or system configurable value.

A mobile device can be configured to track in a period of time a number of transitions that the mobile device transitions to a nominal operation state to present a beacon message. A score can be based on the number of such transitions. For example, a wake-up tracking component 925 can be based on the number of transitions K in a period of time that the mobile device has transitioned to a nominal state to present a beacon message. In some implementations, the number of wake-ups can be limited if the number of transitions K exceeds a predetermined value. In some implementations, the wake-up tracking component 925 can take on a negative value to cause the limiting of transitions.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, at a mobile device in a first operational state, a beacon message from a beacon device over a short-range communication link;

determining a score based on the beacon message and one or more criteria for causing a transition from the first operational state to a second operational state, wherein the second operational state consumes more energy from a battery of the mobile device than the first operational state;

determining whether the score exceeds a threshold for causing the transition;

if the score does not exceed the threshold, maintaining the mobile device in the first operational state; and if the score exceeds the threshold, transitioning the mobile device to the second operational state and presenting the beacon message through the mobile device in the second operational state.

2. The method of claim 1, wherein transitioning the mobile device to the second operational state comprises activating a screen of the mobile device, and wherein presenting the beacon message comprises displaying content corresponding to the beacon message on the screen.

3. The method of claim 1, comprising:
tracking in a period of time a number of transitions that the mobile device transitions to the second operation state to present one or more beacon messages, wherein the score is based on the number of transitions.

4. The method of claim 1, wherein the score is based on whether content from the beacon message has been previously received, presented through the mobile device, or both.

5. The method of claim 1, wherein the score is based on a charge level of the battery.

6. The method of claim 1, comprising:
running an application as a background process on the mobile device, the application being configured to determine the score; and
wherein transitioning the mobile device to the second operational state comprises operating the application to transition to a foreground process on the mobile device and display content corresponding to the beacon message on a display of the mobile device.

7. The method of claim 1, comprising:
determining a range estimation between the mobile device and the beacon device based on a received signal strength value corresponding to the beacon message, wherein the score is based on the range estimation.

8. The method of claim 1, wherein determining the score comprises determining whether there is a pre-existing reason for visiting an establishment associated with the beacon device.

9. A system comprising:
a network interface configured to communicate with mobile devices; and
processor electronics configured to store applications, including an application, for download to the mobile devices via the network interface,
wherein the application comprises instructions to cause a mobile device to perform operations comprising:
receiving, in a first operational state, a beacon message from a beacon device over a short-range communication link;
determining a score based on the beacon message and one or more criteria for causing a transition from the first operational state to a second operational state, wherein the second operational state consumes more energy from a battery of the mobile device than the first operational state;
determining whether the score exceeds a threshold for causing the transition;

if the score does not exceed the threshold, maintaining the mobile device in the first operational state; and if the score exceeds the threshold, transitioning the mobile device to the second operational state and presenting the beacon message through the mobile device in the second operational state.

10. The system of claim 9, wherein transitioning the mobile device to the second operational state comprises activating a screen of the mobile device, and wherein presenting the beacon message comprises displaying content corresponding to the beacon message on the screen.

11. The system of claim 9, wherein the operations comprise:
tracking in a period of time a number of transitions that the mobile device transitions to the second operation state to present one or more beacon messages, wherein the score is based on the number of transitions.

12. The system of claim 9, wherein the score is based on whether content from the beacon message has been previously received, presented through the mobile device, or both.

13. The system of claim 9, wherein the score is based on a charge level of the battery.

14. The system of claim 9, wherein the application is configured to run as a background process while the mobile device is in the first operational state, and wherein transitioning the mobile device to the second operational state comprises operating the application to transition from the background process to a foreground process on the mobile device and display content corresponding to the beacon message on a display of the mobile device.

15. The system of claim 9, wherein the operations comprise:
determining a range estimation between the mobile device and the beacon device based on a received signal strength value corresponding to the beacon message, wherein the score is based on the range estimation.

16. The system of claim 9, wherein determining the score comprises determining whether there is a pre-existing reason for visiting an establishment associated with the beacon device.

17. A mobile device comprising:
circuitry configured to receive a beacon message from a beacon device over a short-range communication link; and
a processor configured to perform operations comprising:
receiving, in a first operational state, the beacon message via the circuitry;
determining a score based on the beacon message and one or more criteria for causing a transition from the first operational state to a second operational state, wherein the second operational state consumes more energy from a battery of the mobile device than the first operational state;
determining whether the score exceeds a threshold for causing the transition;
if the score does not exceed the threshold, maintaining the mobile device in the first operational state; and
if the score exceeds the threshold, transitioning the mobile device to the second operational state and presenting the beacon message through the mobile device in the second operational state.

18. The mobile device of claim 17, wherein transitioning the mobile device to the second operational state comprises activating a screen of the mobile device, and wherein presenting the beacon message comprises displaying content corresponding to the beacon message on the screen.

19. The mobile device of claim 17, wherein the operations comprise:
  tracking in a period of time a number of transitions that the mobile device transitions to the second operation state to present one or more beacon messages, wherein the score is based on the number of transitions.

20. The mobile device of claim 17, wherein the score is based on whether content from the beacon message has been previously received, presented through the mobile device, or both.

21. The mobile device of claim 17, wherein the score is based on a charge level of the battery.

22. The mobile device of claim 17, wherein the operations comprise:
  running an application as a background process on the mobile device, the application being configured to determine the score; and
  wherein transitioning the mobile device to the second operational state comprises operating the application to transition to a foreground process on the mobile device and display content corresponding to the beacon message on a display of the mobile device.

23. The mobile device of claim 17, wherein the operations comprise:
  determining a range estimation between the mobile device and the beacon device based on a received signal strength value corresponding to the beacon message, wherein the score is based on the range estimation.

24. The mobile device of claim 17, wherein determining the score comprises determining whether there is a pre-existing reason for visiting an establishment associated with the beacon device.

* * * * *